United States Patent
Suzuki et al.

(10) Patent No.: US 9,425,710 B2
(45) Date of Patent: Aug. 23, 2016

(54) ELECTROSTATIC INDUCTION CONVERSION DEVICE AND DC-DC CONVERTER

(71) Applicants: AOI ELECTRONICS CO., LTD., Kagawa (JP); NATIONAL UNIVERSITY CORPORATION SHIZUOKA UNIVERSITY, Shizuoka (JP)

(72) Inventors: Masato Suzuki, Takamatsu (JP); Hiroki Hayashi, Takamatsu (JP); Gen Hashiguchi, Hamamatsu (JP); Tatsuhiko Sugiyama, Hamamatsu (JP)

(73) Assignees: AOI Electronics Co., Ltd., Takamatsu-shi (JP); National University Corporation Shizuoka University, Shizuoka-shi (JP)

( * ) Notice: Subject to any disclaimer, the term of this patent is extended or adjusted under 35 U.S.C. 154(b) by 169 days.

(21) Appl. No.: 14/386,650

(22) PCT Filed: Aug. 26, 2013

(86) PCT No.: PCT/JP2013/072724
§ 371 (c)(1),
(2) Date: Sep. 19, 2014

(87) PCT Pub. No.: WO2014/034602
PCT Pub. Date: Mar. 6, 2014

(65) Prior Publication Data
US 2015/0070941 A1 Mar. 12, 2015

(30) Foreign Application Priority Data
Aug. 31, 2012 (JP) .................. 2012-192113

(51) Int. Cl.
*H02M 3/34* (2006.01)
*H02N 1/00* (2006.01)
*H02N 1/08* (2006.01)

(52) U.S. Cl.
CPC . *H02N 1/08* (2013.01); *H02M 3/34* (2013.01); *H02N 1/006* (2013.01)

(58) Field of Classification Search
CPC .......... H02N 1/08; H02N 1/006; H02M 3/34; H01L 41/00; H01L 41/0838; F03G 7/00; F03G 7/005
USPC ..................... 363/19; 310/300, 328
See application file for complete search history.

(56) References Cited

U.S. PATENT DOCUMENTS 7,659,652 B2 * 2/2010 Kato .................... G02B 6/3566
310/309
7,804,205 B2 * 9/2010 Murayama ........... H01G 5/0136
257/651

(Continued)

FOREIGN PATENT DOCUMENTS

JP 4-325882 A 11/1992
JP 2004082288 * 3/2004

(Continued)

OTHER PUBLICATIONS

Search Report from TC 2800 STIC searcher John DiGeronimo.*

(Continued)

*Primary Examiner* — Timothy J Dole
*Assistant Examiner* — Htet Z Kyaw
(74) *Attorney, Agent, or Firm* — Crowell & Moring LLP

(57) ABSTRACT

An electrostatic induction conversion device includes: an input-side electrostatic actuator that includes a first fixed electrode and a first movable electrode facing the first fixed electrode; and an output-side electrostatic actuator that includes a second movable electrode linked to the first movable electrode via a link mechanism member, which increases or decreases a displacement quantity representing an extent of displacement occurring at the first movable electrode, and a second fixed electrode facing the second movable electrode, wherein: a permanently charged layer is deposited on an electrode surface either on a movable electrode side or on a fixed electrode side, at the input-side electrostatic actuator and the output-side electrostatic actuator.

14 Claims, 17 Drawing Sheets

(56) References Cited

U.S. PATENT DOCUMENTS

| | | | |
|---|---|---|---|
| 7,987,703 B2 | 8/2011 | Konno et al. | |
| 8,018,118 B2* | 9/2011 | Tsuboi | B81B 3/0078 |
| | | | 310/309 |
| 8,102,097 B2* | 1/2012 | Naruse | H02N 1/006 |
| | | | 310/300 |
| 2007/0229271 A1 | 10/2007 | Shionoiri et al. | |
| 2011/0023604 A1* | 2/2011 | Cazzaniga | G01C 19/5712 |
| | | | 73/514.32 |
| 2014/0346923 A1* | 11/2014 | Hayashi | H02M 5/32 |
| | | | 310/309 |

FOREIGN PATENT DOCUMENTS

| | | |
|---|---|---|
| JP | 2007-280368 A | 10/2007 |
| JP | 2009-8671 A | 1/2009 |
| JP | 2011-62024 A | 3/2011 |
| JP | 2013-240139 A | 11/2013 |

OTHER PUBLICATIONS

Corresponding International Search Report with English Translation dated Oct. 1, 2013 (two (2) pages).

* cited by examiner

EQUIVALENT CIRCUIT

ELECTROSTATIC INDUCTION CONVERSION DEVICE AND DC-DC CONVERTER

TECHNICAL FIELD

The present invention relates to an electrostatic induction conversion device and a DC-DC converter.

BACKGROUND ART

A booster circuit configured with a three-terminal comb teeth actuator manufactured through the MEMS technology is known in the related art (see patent literature 1). The three-terminal comb teeth actuator described in patent literature 1, comprises a first comb teeth actuator that includes a first comb teeth electrode and a second comb teeth electrode engaged with the first comb teeth electrode via a specific gap and a second comb teeth actuator that includes a third comb teeth electrode and a fourth comb teeth electrode engaged with the third comb teeth electrode via a specific gap. In this three terminal comb teeth actuator, the second comb teeth electrode and the third comb teeth electrode are formed as an integrated unit so as to achieve equal extents of displacement and an output is extracted from one of the comb teeth electrodes.

To describe the booster circuit disclosed in patent literature 1 in more specific terms, it includes two electrostatic actuators, an input-side electrostatic comb teeth actuator and an output-side electrostatic comb teeth actuator manufactured through the MEMS technology. The movable comb teeth electrodes in the two electrostatic actuators are made to interlock with each other through a mechanical link, and a DC voltage is separately applied to the output-side electrostatic comb teeth actuator or an electric field is generated via an electret for the output-side electrostatic comb teeth actuator (see FIG. 1 and FIG. 2 in patent literature 1). The two electrostatic actuators are placed in an environment achieving a high degree of vacuum (vacuum sealing of the movable comb teeth electrodes) and an AC input is applied toward the input-side electrostatic actuator (or self-excited oscillation is induced by forming a feedback circuit). In this situation, as the input-side electrostatic actuator oscillates, the output-side electrostatic actuator also oscillates, which induces an electric charge through electrostatic induction and ultimately provides a voltage boosted to a level equal to or higher than the input voltage. The output voltage thus obtained, which is an AC voltage, undergoes rectification in a circuit disposed at a subsequent stage so as to obtain a boosted DC voltage.

CITATION LIST

Patent Literature

Patent literature 1: Japanese laid open patent publication No. 2011-62024

SUMMARY OF THE INVENTION

Technical Problem

As the description provided above clearly indicates, when the movable comb teeth electrode in the input-side electrostatic comb teeth actuator and the movable comb teeth electrode in the output-side electrostatic comb teeth actuator are interlocked through a mechanical link, the amplitude of the movable comb teeth electrode on the input side and the amplitude of the movable comb teeth electrode on the output side are bound to match each other. This means that in order to provide a higher output voltage, it must be ensured that a sufficiently large extent of oscillation occurs at the movable comb teeth electrodes even when a weak AC voltage is applied to the input side. In order to allow the movable comb teeth electrodes to oscillate to a sufficiently large extent, in turn, the spring constant (see FIG. 3 and [0032] in patent literature 1) must be lowered so as to increase the Q value of the circuit and the movable comb teeth electrodes need to be vacuum sealed so as to minimize the air resistance.

However, a high Q value can be achieved only at the cost of the degree of freedom in design since the weight of the circuit must be reduced in order to lower the spring constant. Furthermore, when greater amplitude is achieved at the movable comb teeth electrodes, the effect of the beam non-linearity is bound to manifest to a greater extent as well. All in all, a high Q value cannot be achieved readily.

Solution to Problem

According to the 1st aspect of the present invention, an electrostatic induction conversion device comprises: an input-side electrostatic actuator that includes a first fixed electrode and a first movable electrode facing the first fixed electrode; and an output-side electrostatic actuator that includes a second movable electrode linked to the first movable electrode via a link mechanism member, which increases or decreases a displacement quantity representing an extent of displacement occurring at the first movable electrode, and a second fixed electrode facing the second movable electrode, wherein: a permanently charged layer is deposited on an electrode surface either on a movable electrode side or on a fixed electrode side, at the input-side electrostatic actuator and the output-side electrostatic actuator.

According to the 2nd aspect of the present invention, in the electrostatic induction conversion device according to the 1st aspect, it is preferred that the first movable electrode, the link mechanism member and the second movable electrode are all formed by using a single material.

According to the 3rd aspect of the present invention, in the electrostatic induction conversion device according to the 2nd aspect, it is preferred that a movable portion, which is configured with the first movable electrode, the link mechanism member and the second movable electrode, rotates as one centered on a hinge mechanism located at an end of the link mechanism member or at a specific intermediate position at the link mechanism member.

According to the 4th aspect of the present invention, in the electrostatic induction conversion device according to the 3rd aspect, it is preferred that: if the hinge mechanism is located at the end of the link mechanism member, the first movable electrode and the second movable electrode rotate, centered on the end of the link mechanism member, along matching directions; and if the hinge mechanism is located at the specific intermediate position at the link mechanism member, the first movable electrode and the second movable electrode rotate, centered on the specific intermediate position, along opposite directions.

According to the 5th aspect of the present invention, in the electrostatic induction conversion device according to any one of the 1st through 4th aspects, it is preferred that as the first movable electrode is caused to oscillate by applying an AC input signal to the input-side electrostatic actuator and the second movable electrode is caused to oscillate in correspondence to oscillation of the first movable electrode, an AC output signal, resulting from boosting or lowering the voltage of the AC input signal, is obtained from the output-side electrostatic actuator.

According to the 6th aspect of the present invention, in the electrostatic induction conversion device according to the 5th aspect, it is preferred that a ratio of the voltage of the AC input signal and the voltage of the AC output signal is determined based upon a length of the first movable electrode, a length of the link mechanism member and a length of the second movable electrode.

According to the 7th aspect of the present invention, in the electrostatic induction conversion device according to the 6th aspect, it is preferred that: when $a_k$ represents a distance between a fulcrum of rotation of the second movable electrode and an intermediate position at the second movable electrode, $a_l$ represents a distance between the intermediate position at the second movable electrode and an intermediate position at the first movable electrode, and the first movable electrode and the second movable electrode rotate, centered on the fulcrum, along matching directions; and the ratio $|e_{out}/e_{in}|$ of the voltage $e_{in}$, of the AC input signal and the voltage $e_{out}$ of the AC output signal is expressed as $|e_{out}/e_{in}|=|1+3a_l/2a_k|$.

According to the 8th aspect of the present invention, a DC-DC converter comprises: an electrostatic induction conversion device according to any one of the 1st through 7th aspects; an amplifier that has a gain determined based upon an input DC voltage; and a rectifier circuit, wherein: a self-oscillation circuit is formed by connecting the input-side electrostatic actuator in the electrostatic induction conversion device between an input terminal and an output terminal of the amplifier; as an AC signal generated through the self-oscillation circuit is input to the input-side electrostatic actuator, an AC signal is output from the output-side electrostatic actuator corresponding to the input-side electrostatic actuator in the electrostatic induction conversion device; and the rectifier circuit outputs a DC voltage by rectifying the AC signal output from the output-side electrostatic actuator.

Advantageous Effect of the Invention

According to the present invention, which provides a system often referred to as an electrostatic transformer by forming a permanently charged layer either at the movable electrode or the fixed electrode of an electrostatic actuator, a desired input-output conversion function and a DC-DC conversion function can be achieved through the use of elements smaller than those used in the related art. Furthermore, it is obvious that the present inventions make it possible to achieve an AC-AC conversion function as in a regular transformer in the related art, in addition to the DC-DC conversion function.

DESCRIPTION OF EMBODIMENTS

The prerequisite base technologies essential to the present invention will be first explained before providing a detailed description of the embodiments of the present invention.
(Description of Prerequisite Base Technologies)
§Prerequisite Base Technology (1)

Figure 1:
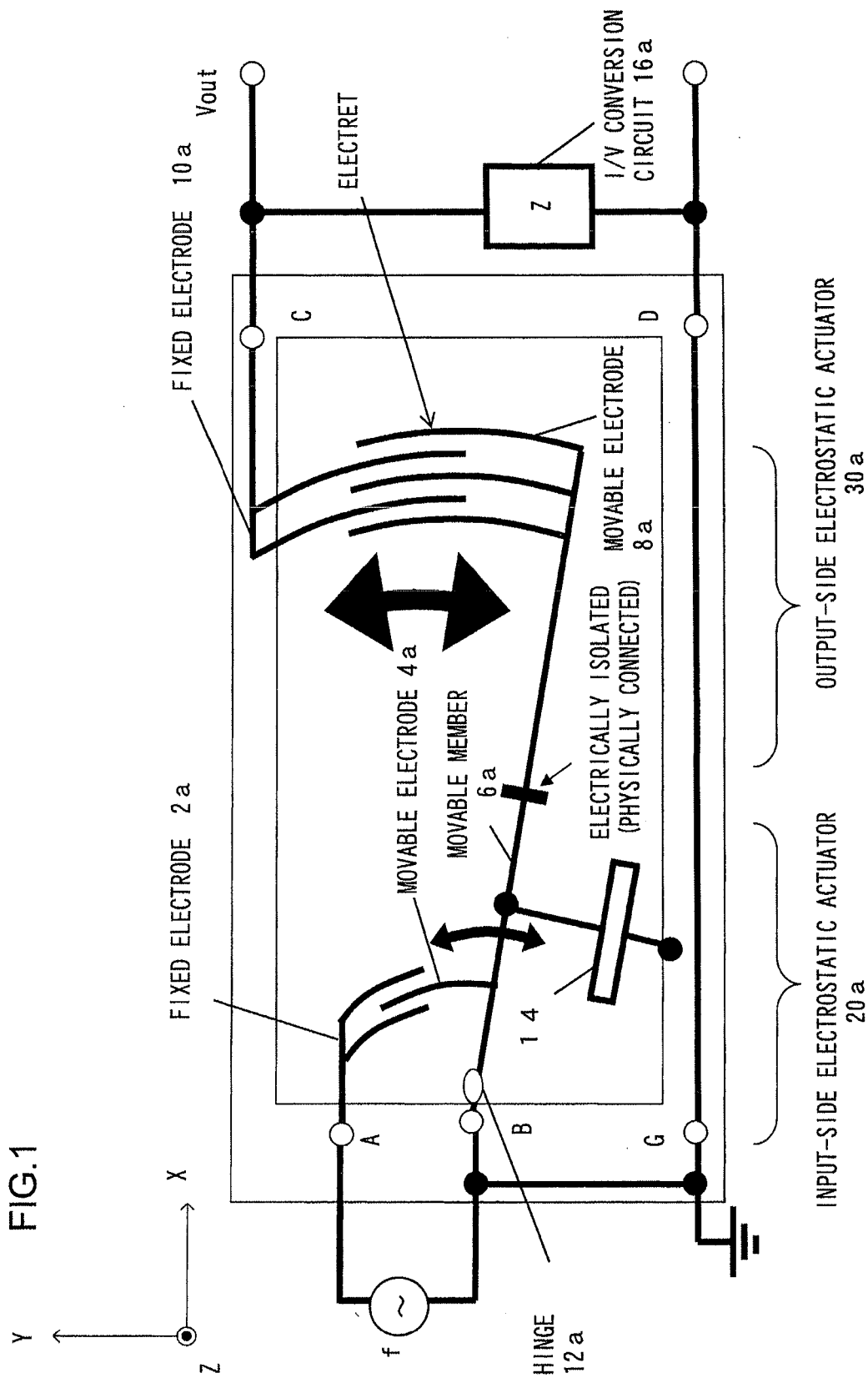
FIG. 1 A plan view of an electrostatic conversion device equipped with a hinge mechanism representing a prerequisite base technology essential to the description of the present invention.
Figure 2:
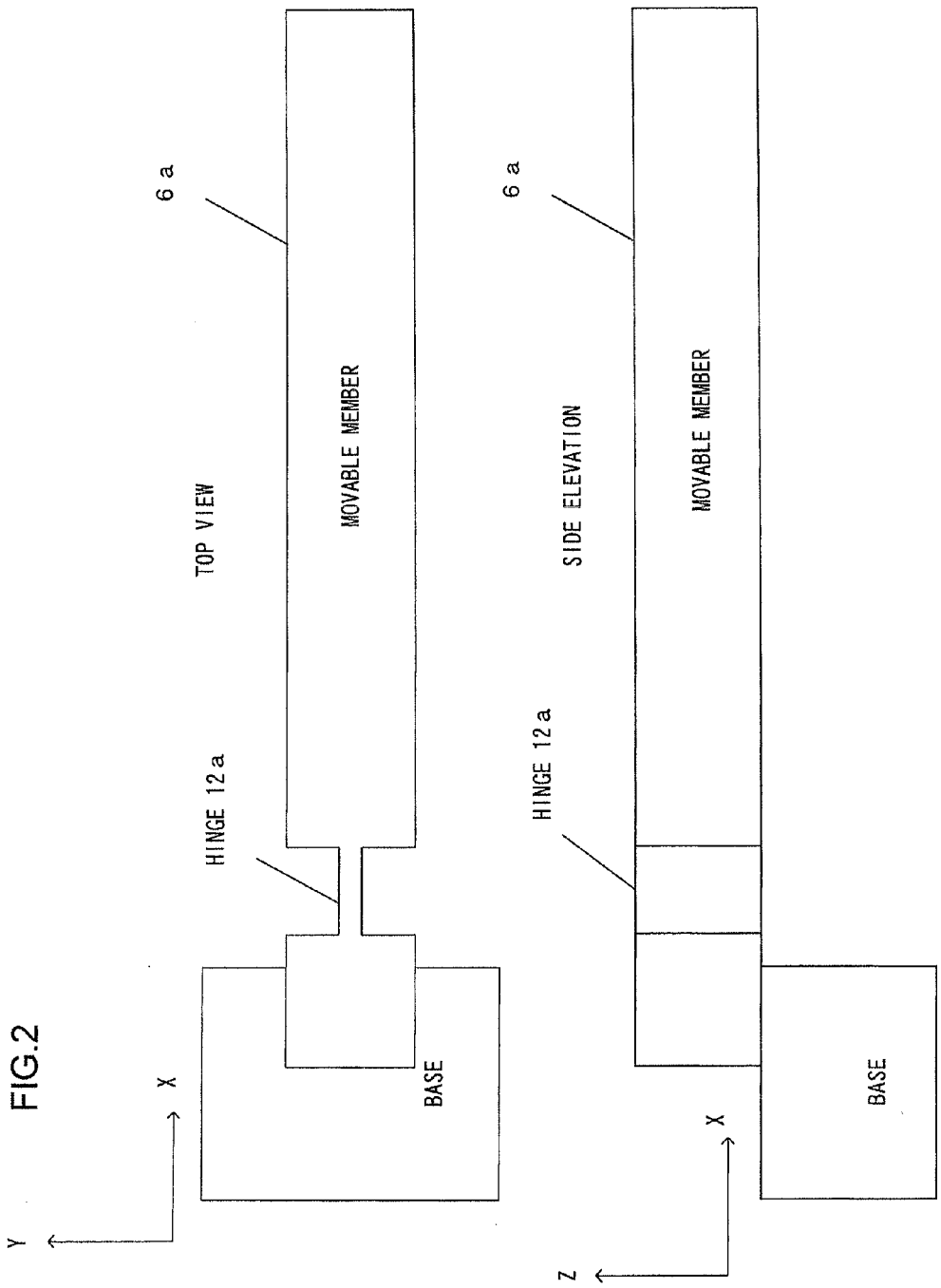
FIG. 2 Illustrations pertaining to the structure of the hinge shown in FIG. 1.
Figure 3:
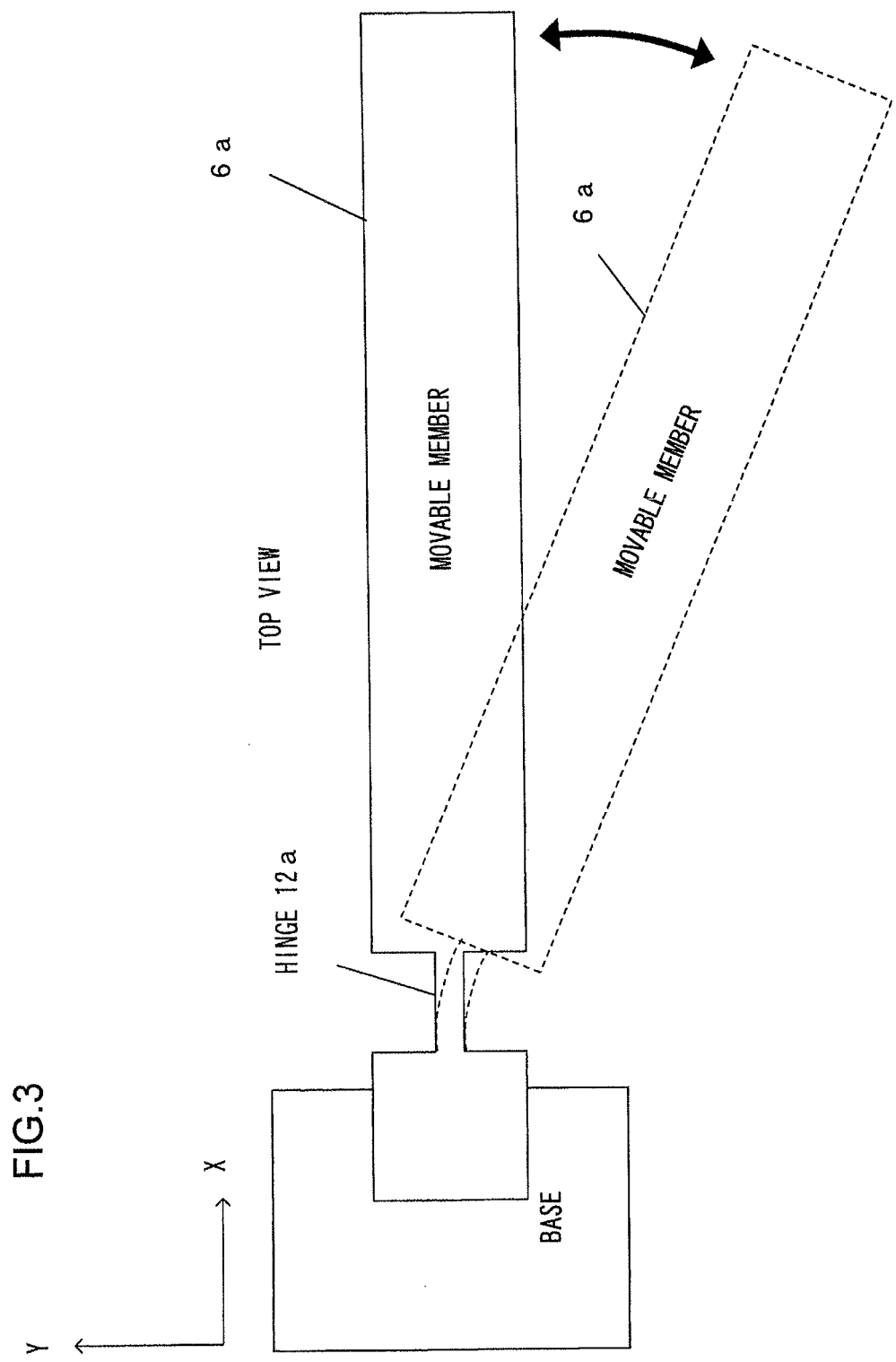
FIG. 3 An illustration showing how the hinge in FIG. 1 rotates.

FIG. 1 is a plan view of an electrostatic conversion device equipped with a hinge mechanism, representing a prerequisite base technology that will be explained before the present invention is described. FIG. 2 illustrates the structure of the hinge shown in FIG. 1. FIG. 3 illustrates how the hinge in FIG. 1 rotates.

The electrostatic conversion device representing the prerequisite base technology is capable of fulfilling a voltage-boosting function whereby the level of the output voltage is boosted relative to the level of the input voltage. A fixed electrode 2a and a movable electrode 4a in FIG. 1 constitute a fixed comb teeth electrode (a fixed comb electrode) and a movable comb teeth electrode (a movable comb electrode) that are engaged with each other via a specific gap formed between them. It is to be noted that the fixed comb teeth electrode 2a and the movable comb teeth electrode 4a extend along a Z axis in FIG. 1. The movable electrode 4a is secured to a movable member 6a.

As the movable member 6a rotates centered on a hinge 12a, over an X-Y plane, an input-side electrostatic actuator 20a is configured with the fixed comb teeth electrode 2a and the movable comb teeth electrode 4a. The initial position taken by the movable member 6a is defined by a support member 14 such as a spring. The structure of the hinge 12a will be described in specific detail later in reference to FIG. 2 and FIG. 3.

Another end of the movable member 6a (i.e., the end further away from the hinge 12a) is connected to an output-side movable electrode 8a. As are the electrodes in the input-side electrostatic actuator 20a, the movable electrode 8a and a fixed electrode 10a are a movable comb teeth electrode (a movable comb electrode) and a fixed comb teeth electrode (a fixed comb electrode) that engage with each other via a specific gap formed between them. The fixed electrode 10a and the movable electrode 8a configure an output-side electrostatic actuator 30a.

The movable electrode (movable comb teeth electrode) 4a at the input-side electrostatic actuator 20a and the movable electrode (movable comb teeth electrode) 8a at the output-side electrostatic actuator 30a are each secured to one of the two ends of the movable portion 6a. As a result, the movable electrode 8a in the output-side electrostatic actuator 30a is displaced along a direction matching the direction of displacement of the movable electrode 4a in the input-side electrostatic actuator 20a. In addition, since the movable member 6a rotates in the X-Y plane with the rotational center thereof set at the hinge 12a, the extent to which the output-side movable electrode 8a is displaced is equal to a displacement quantity obtained by amplifying the displacement quantity indicating the extent of displacement of the input-side movable electrode 4a. In other words, assuming that L represents the displacement quantity at the input-side movable electrode 4a, the displacement quantity for the output-side movable electrode 8a is expressed as; $M=k \cdot L$ ($k>1$).

It is to be noted that an insulating member must be inserted in the middle of the movable member 6a so as to electrically isolate the input-side movable electrode 4a and the output-side movable electrode 8a from each other. In FIG. 1, the insulator is schematically indicated with the filled rectangle.

In addition, since the movable member 6a rotates around the hinge 12a so as to form a circular arc, the individual comb teeth electrodes constituting the movable electrode 4a, the fixed electrode 2a, the movable electrode 8a and the fixed electrode 10a, too, are curved to form circular arcs. These circular arcs should be curves formed on the X-Y plane, and the comb teeth electrodes do not need to curve over the X-Z plane.

Next, in reference to FIG. 2 and FIG. 3, the structure of the hinge 12a will be described in specific detail. While a hinge in the commonly known form includes a physical sliding surface that rotates around a center pin, there is a challenge that needs to be addressed with regard to a hinge included in an MEMS structure in that since lubricating oil or the like cannot be delivered with ease in the MEMS structure, the sliding surface is bound to become worn readily. Furthermore, if a hinge in the commonly known form is to be formed through the MEMS technology, numerous sacrificial layers will need to be etched, leading to high production costs and thus, adopting the common hinge structure in conjunction with the MEMS technology is not realistic. Accordingly, in the electrostatic conversion device shown in FIG. 1 achieved by adopting the MEMS technology, a portion with a smaller thickness, which can be physically flexed with greater ease compared to other areas, is formed and this thin portion fulfills the functions of the hinge 12a.

The portion that is flexed (rotated) is formed so as to achieve a smaller thickness in the plan view (in the X-Y plane), as shown in FIG. 2, and this thin portion functions as the hinge 12a. Namely, the thinner portion, formed so as to flex more readily than the other areas, takes on the semblance of a center pin and fulfills functions similar to those of a center pin in response to an external force applied thereto and, as a result, the movable member 6a rotates in a circular arc centered on the thin portion. It is to be noted that as the X-Z plan view in FIG. 2 indicates, this portion does not have a small wall thickness measured along the vertical direction (along the Z axis) and thus, there is no rotation around the hinge 12a along the vertical direction.

In reference to FIG. 1, a permanently charged layer disposed in the output-side electrostatic actuator 30a will be described. In the electrostatic conversion device shown in FIG. 1, a permanently charged layer is formed by using an electret instead of connecting a DC source to the output-side electrostatic actuator 30a. In more specific terms, an electret is formed on a side surface of either the movable electrode 8a or the fixed electrode 10a in the output-side electrostatic actuator 30a. As an alternative, either comb teeth electrode may be formed with an electret.

This electret is constituted of a silicon oxide containing positive ions of an alkali metal or an alkali earth metal. Ions of potassium, calcium, sodium or lithium are used as the ions. The electret is formed by oxidizing silicon within an alkaline atmosphere. Obviously, an electric charge may be induced at the silicon oxide from the outside through a corona discharge or solid-state ions may be injected into the silicon oxide from the outside through ion implantation as an alternative. However, an electret cannot easily be formed at a side surface of the comb teeth electrode in conjunction with the alternative process.

An AC voltage source is connected between input terminals A and B of the input-side electrostatic actuator 20a. In addition, an I/V conversion circuit 16a, which extracts the electric charge induced at the fixed electrode 10a and converts the extracted charge to a voltage, is connected between output terminals C and D of the output-side electrostatic actuator 30a. The electrostatic conversion device configured as shown in FIG. 1 is thus able to function as a voltage booster circuit.

In addition, the boost rate setting can be adjusted by selecting the optimal length for the movable member 6a. Furthermore, by switching positions for the input-side electrostatic actuator 20a and the output-side electrostatic actuator 30a, the electrostatic conversion device can be reconfigured to function as a voltage lowering circuit.

An AC voltage is applied between the input terminals A and B and the B terminal and a G terminal are grounded in the electrostatic conversion device shown in FIG. 1. The movable member 6a is thus caused to rotate (oscillate) over the X-Y plane by tracing a circular arc. The output-side electrostatic actuator 30a is disposed at a position further outward (further away) relative to the input-side electrostatic actuator 20a from the hinge 12a, and thus, the amplitude at the output-side electrostatic actuator 30a due to the oscillation is greater than the amplitude at the input side actuator 20a. Then, as the output-side movable electrode 8a (i.e., the movable comb teeth electrode) moves through the electric field generated via the electret, an electric charge is induced through electrostatic induction and thus, an output current is generated.

Since the output-side movable electrode 8a oscillates with greater amplitude than that at the input-side movable electrode 4a, this output current achieves a greater current value, distinguishing the present invention from the three-terminal actuator disclosed in patent literature 1.

It is to be noted that the electret should hold a sufficient electric charge, the output-side electrostatic actuator 30a should assure a sufficiently large electrostatic capacity and the parasitic capacity should be minimized in order to allow an increase in the output current. In addition, while BT (bias temperature) processing may be required when charging the electret, a conductive path connected to the electret should be formed in advance and this conductive path should be removed after the BT processing. As an alternative to this, a spring may be connected to the output-side movable portion so as to use this area as a conductive path. By installing the IN conversion circuit 16a at a stage rearward relative to the current induced through the electrostatic induction, it is possible to extract an AC voltage higher than the input AC voltage.

To summarize, the electrostatic conversion device shown in FIG. 1 is able to fulfill functions similar to those of a regular transformer, as well as those of a booster circuit and a voltage lowering circuit equipped with the movable electrode 4a and the movable electrode 8a caused to rotate by the movable member 6a adopting a cantilever structure.

§Prerequisite Base Technology (2)

Figure 4:
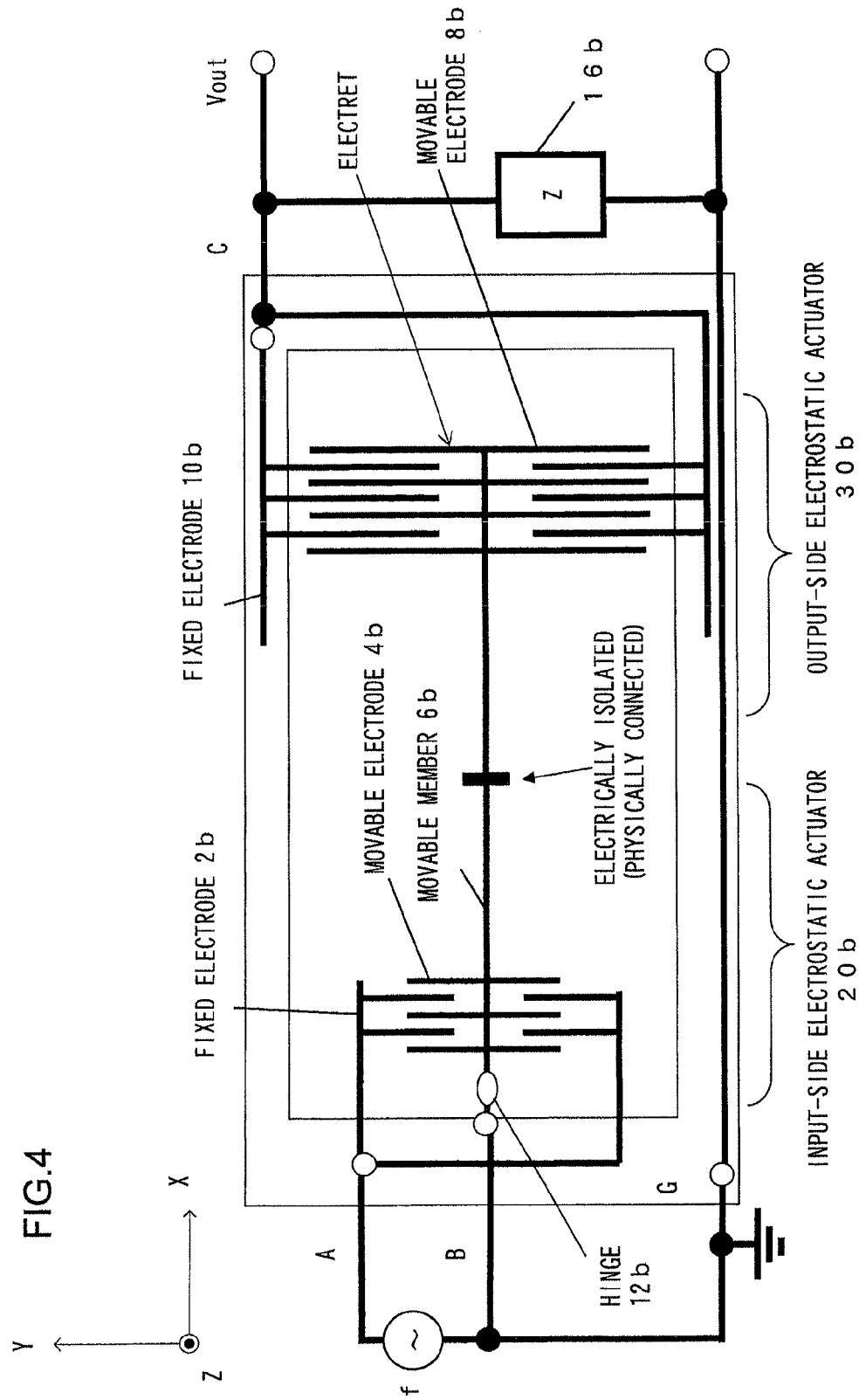
FIG. 4 A plan view of an electrostatic conversion device equipped with a hinge mechanism different from that in FIG. 1, representing a prerequisite base technology essential to the description of the present invention.
Figure 5:
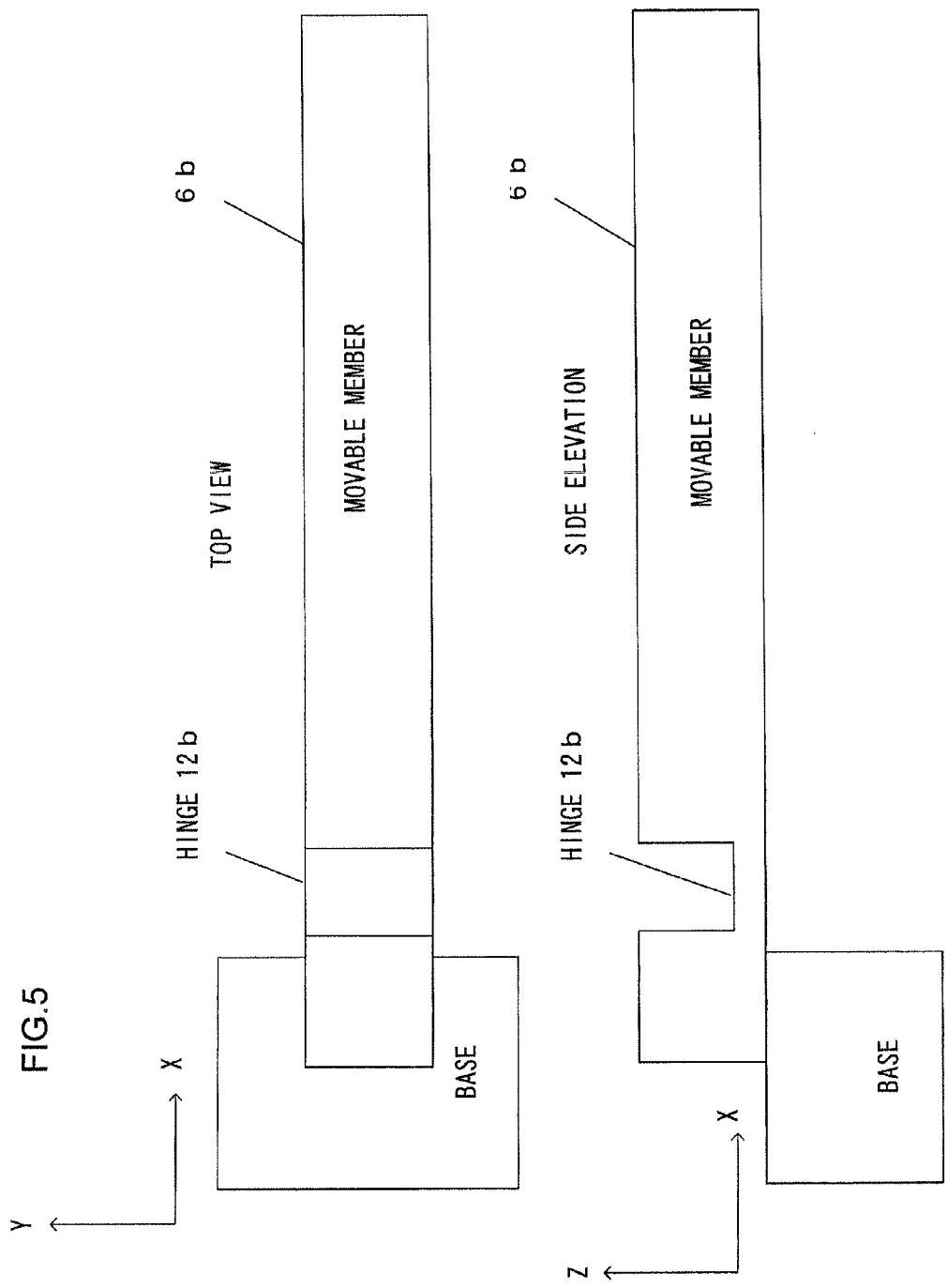
FIG. 5 Illustrations pertaining to the structure of the hinge shown in FIG. 4.
Figure 6:
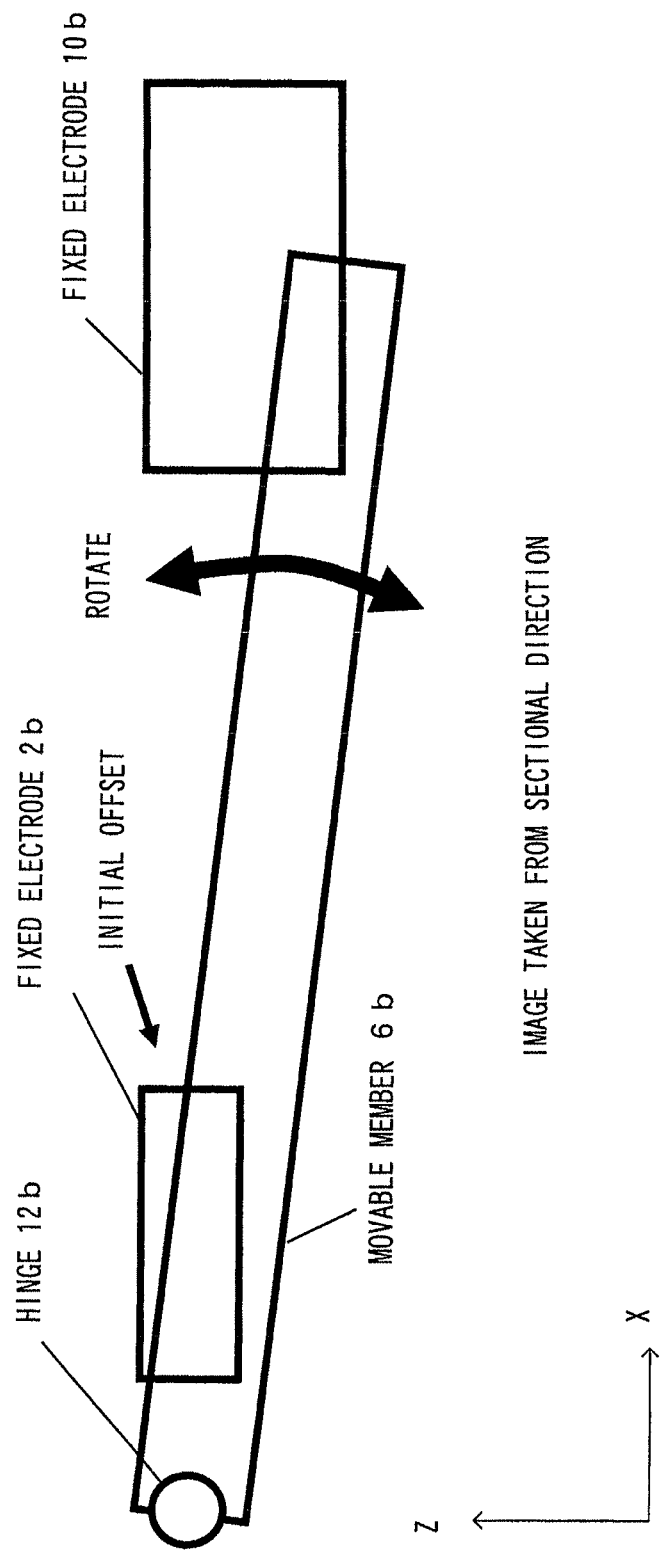
FIG. 6 An illustration showing how the hinge in FIG. 4 rotates.

FIG. 4 is a plan view of an electrostatic conversion device equipped with a hinge mechanism different from that shown in FIG. 1, representing a prerequisite base technology that will be explained before the present invention is described. FIG. 5 illustrates the structure of the hinge shown in FIG. 4. FIG. 6 illustrates how the hinge in FIG. 4 rotates. While the electrostatic conversion device is similar to that shown in FIG. 1 in that it fulfills the function of boosting the voltage between the input side and the output side, it is distinguishable from the electrostatic conversion device in FIG. 1 in that its movable member 6b rotates along the vertical direction (along the Z axis). Namely, as the movable member 6b oscillates along the vertical direction (along the Z axis) around a hinge 12b set at the rotational center, an AC current is extracted from a fixed electrode 10b in an output-side electrostatic actuator 30.

As FIG. 5, showing the structure of the hinge 12b, clearly indicates, this electrostatic conversion device is distinguishable from the electrostatic conversion device in FIG. 1 in that its hinge assumes a smaller thickness along the Z-direction so that the movable member rotates, centered on the hinge 12b, along the vertical direction. In addition, the movable member 6b adopting a cantilever structure is similar to that in embodiment 1 in that its left portion and right portion are electrically isolated from each other. Furthermore, as in the electrostatic conversion device shown in FIG. 1, an electret is formed at a movable electrode surface in the output-side electrostatic actuator 30b.

As described above, a degree of freedom is afforded to the movable member 6b linked to the hinge 12b so as to allow it to oscillate along the vertical direction. In addition, a fixed electrode 2b and a movable electrode 4b manifest an initial offset along the vertical direction (along the Z axis), which is greater than the value representing half the amplitude of the input-side movable electrode caused to oscillate by an AC voltage input thereto, at the initial stage. Unless such an initial offset is manifested by the movable electrode 4b and the fixed electrode 2b along the vertical direction (along the Z axis) in the input-side electrostatic actuator 20b, the movable member 6b cannot oscillate along the vertical direction.

An AC voltage is applied between the input terminals A and B and the B and G terminals are grounded. The movable member 6b linked to the movable electrode 4b oscillates along the vertical direction (along the Z axis) by tracing a circular arc. The output-side electrostatic actuator 30b is disposed at a position further outward (further away) relative to the input-side electrostatic actuator 20b from the hinge 12b, and thus, the amplitude at the output-side electrostatic actuator 30b due to the oscillation is greater than the amplitude at the input side actuator 20b. It is desirable that the thicknesses of the fixed electrode 10b and the movable electrode 8b measured along the vertical direction in the output-side electrostatic actuator 30b in this configuration be greater than the thicknesses of the fixed electrode 2b and the movable electrode 4b in the input-side electrostatic actuator 20b.

To summarize, the electrostatic conversion device shown in FIG. 4 is able to fulfill functions similar to those of a regular transformer, as well as those of a booster circuit and a voltage lowering circuit equipped with the movable electrode 4b and the movable electrode 8b caused to rotate by the movable member 6b adopting a cantilever structure.

Next, bearing in mind the concept of the prerequisite base technologies described above, embodiments of the electrostatic induction conversion device according to the present invention will be described in detail.

Embodiment 1

Figure 7:
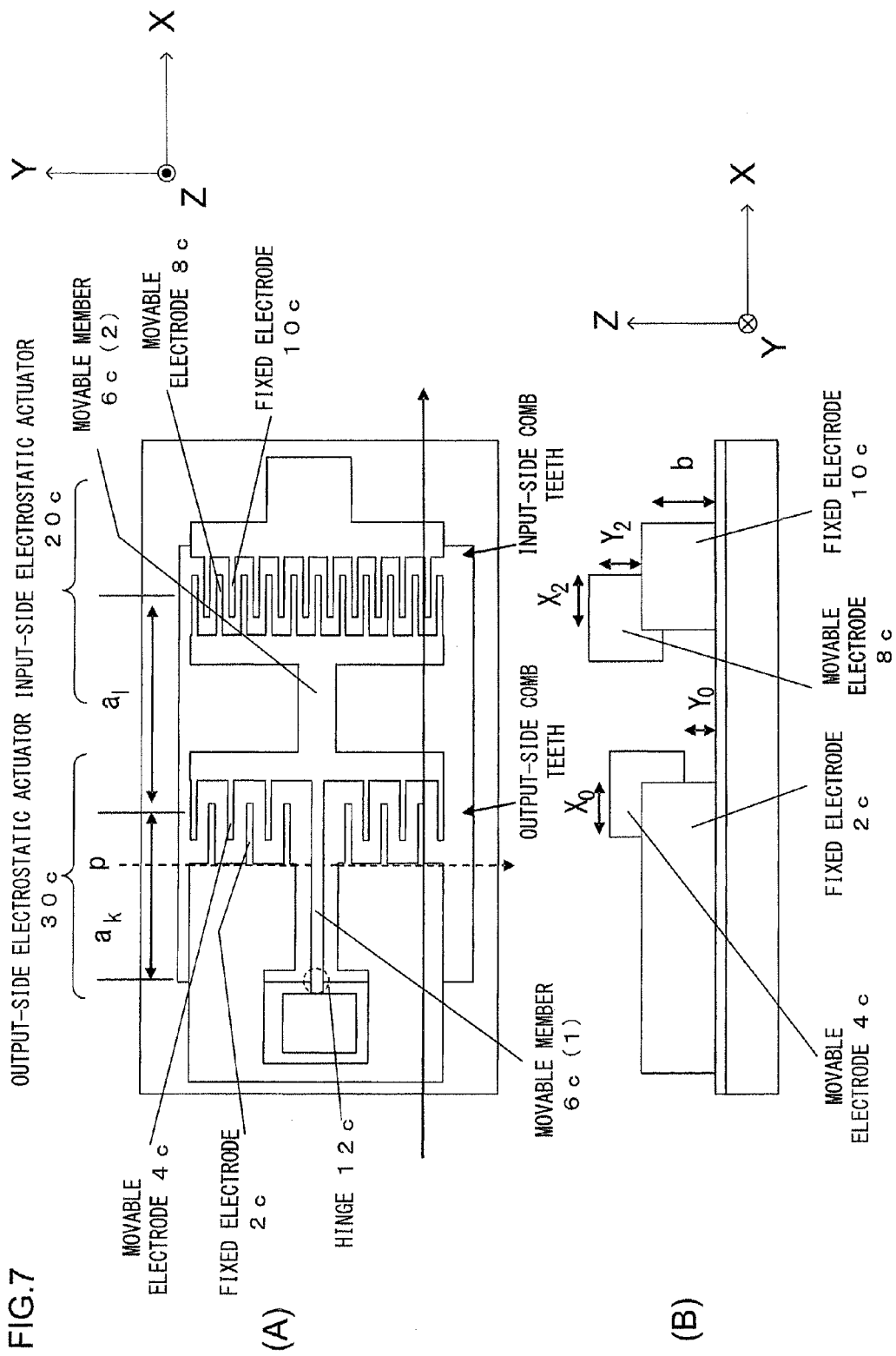
FIGS. 7A, 7B A plan view of the electrostatic induction conversion device configured as embodiment 1 of the present invention.

FIG. 7 shows the embodiment 1 of the present invention in a plan view. The electrostatic induction conversion device shown in this figure is configured so that movable members 6c (1) and 6c (2) rotate along the Z axis, as is the electrostatic conversion device described earlier in reference to FIG. 4. An end (the left end portion in FIG. 7) of one of the movable members, i.e., the movable member 6c (1), forms a hinge 12c similar to that shown in FIG. 5. In other words, a difference is created between the displacement quantity representing the extent of displacement of a movable electrode 4c and the displacement quantity of a movable electrode 8c via a link mechanism member configured with the movable member 6c (1) connected to the hinge 12c and the movable member 6c (2) connected to the extending side (the right side in FIG. 7) of the movable member 6c (1). However, its basic structure is distinct in that since the comb teeth that oscillate to a greater extent are located on the input side for the voltage boosting operation, its input-side comb teeth electrodes take on the right-side position in FIG. 7 and its output-side comb teeth electrodes take on the left-side position in FIG. 7 (for reasons that will be explained later).

It is to be noted that while the conversion device fulfills functions for DC-DC conversion and AC-AC conversion between the input side and the output side as do the conversion devices in the prerequisite base technologies described in reference to FIGS. 1 through 6, the following two structural features greatly distinguish the electrostatic induction conversion device according to the present invention.

Distinct feature 1: The movable members in the electrostatic induction conversion device are distinguishable from the movable members 6a and 6b shown in FIG. 1 and FIG. 4 in that they do not need to be electrically isolated. In other words, the movable electrodes 4c and 8c and the movable members 6c (1) and 6c (2) may be formed with a single electrically conductive material and the functions of an electrostatic transformer can still be fulfilled. This point will be explained in further detail later.

Distinct feature 2: While the input-side electrostatic actuators 20a and 20b shown in FIG. 1 and FIG. 4, each simply configured as an exciter mechanism, do not require an electret layer to be formed thereat, an electret layer is also formed on a surface of the electrode facing opposite the movable electrode 4c or the fixed electrode 2c in the electrostatic induction conversion device shown in FIG. 7 for reasons that will be described in detail later.

First, an arithmetic operation process through which a driving point matrix is determined based upon Lagrange's equation of motion, executed to obtain an electrically equivalent circuit to the electrostatic induction conversion device shown in FIG. 7, will be described first.

The Lagrangian L be expressed as in (1) below.

$$L = \frac{1}{2}m_e v_0^2 + \frac{1}{2}\frac{\rho a_l(4a_k^2 + 6a_k a_l + 3a_l^2)}{4a_k^2}v_0^2 - \frac{1}{2}k(Y+y_0)^2 - \frac{(Q_0+q_0)^2}{2C_0} - \frac{(Q_2+q_2)^2}{2C_2}$$ (expression 1)

-continued $$\frac{\rho a_l(4a_k^2 + 6a_k a_l + 3a_l^2)}{4a_k^2} v_0^2,$$ (expression 2)

included in the second term in the expression above represents an equivalent mass calculated by converting the mass of the area often referred to as a spindle portion (included in $a_l$ in FIG. 7) on a line p.

In addition, a dissipation function F may be expressed as in an expression below.

$$F = \frac{1}{2} r v_0^2$$ (expression 3)

In the expressions presented above, $m_e$ represents the effective mass of the portion referred to as a spring portion (the portion included in $a_k$ in FIG. 7), $v_0$ represents the velocity at the base portion, $\rho$ represents the line density, $a_k$ represents the length of the spring portion (measured to the comb center), $a_l$ represents the length of the spindle portion (measured to the comb center), k represents a spring constant, Y represents the return quantity attributable to the BT processing, $y_0$ represents the displacement manifesting along the Z axis, $Q_0$ represents the initial charge at the base-end comb teeth, $Q_2$ represents the initial charge at the front-end comb teeth, $C_0$ represents the initial capacity at the base-end comb teeth, $C_2$ represents the initial capacity at the front-end comb teeth and r represents the mechanical resistance.

In addition, $X_0$, $X_2$, $Y_0$, $Y_2$ and b in FIG. 7 respectively represent the overlap of the base-end comb teeth, the overlap of the front-end comb teeth, the displacement of the base-end comb teeth manifesting along the Z axis prior to the charge processing, the displacement of the front-end comb teeth manifesting along the Z axis prior to the charge processing and the thickness of the comb teeth.

The following driving point matrix can be obtained by modifying the Lagrangian L provided above to an equation of motion for a mechanical system•electrical system through linear approximation.

$$\begin{bmatrix} f_0 \\ i_0 \\ i_2 \end{bmatrix} = \begin{bmatrix} Z_m & -A & -B \\ A & j\omega C_0 & 0 \\ B & 0 & j\omega C_2 \end{bmatrix} \begin{bmatrix} v_0 \\ e_0 \\ e_2 \end{bmatrix}$$ (expression 4)

$Z_m$, A, B, $C_0$ and $C_2$ in this driving point matrix are respectively expressed as;

$$Z_m = r + j\omega\left(m_e + \frac{\rho b(4a_k^2 + 6a_k a_l + 3a_l^2)}{4a_l^2}\right) + \frac{k}{j\omega}$$ (expression 5)

$$A = \frac{2n_0 \varepsilon_0 X_0 E_0}{d_0}$$ (expression 6)

$$B = \frac{2n_2 \varepsilon_0 X_2 E_2}{d_2}\left(1 + \frac{3a_l}{2a_k}\right)$$ (expression 7)

$$C_0 = \frac{2n_0 \varepsilon_0 X_0 (b - Y_0 + Y)}{d_0}$$ (expression 8)

$$C_2 = \frac{2n_2 \varepsilon_0 X_2 \left\{b + \left(1 + \frac{3a_l}{2a_k}\right)(Y - Y_0)\right\}}{d_2}$$ (expression 9)

The notations used in the expressions are defined as follows.

$n_0$: number of pairs of comb teeth present on the output side
$n_2$: number of pairs of comb teeth present on the input side
$\varepsilon_0$: vacuum permittivity
$d_0$: output-side comb teeth gap
$d_2$: input-side comb teeth gap
$e_0$: output voltage
$e_2$: input voltage
R: impedance matching resistance
$\omega$: angular frequency The expressions presented above lead to;

$$i_0 = -\frac{e_0}{R}$$ (expression 10)

$$\therefore -\frac{e_0}{R} = Av_0 + j\omega C_0 e_0$$

$$\therefore v_0 = -\frac{1}{A}\left(\frac{1}{R} + j\omega C_0\right)e_0$$

$$0 = Z_m v_0 - Ae_0 - Be_2,$$ (expression 11)

and then $$0 = -\left\{\frac{Z_m}{A}\left(\frac{1}{R} + j\omega C_0\right) + A\right\}e_0 - Be_2.$$ (expression 12)

Thus, the voltage amplification rate can be expressed as;

$$\frac{e_0}{e_2} = -\frac{B}{A\left\{1 + \frac{Z_m}{A^2}\left(\frac{1 + j\omega C_0 R}{R}\right)\right\}} \approx -\frac{B}{A}.$$ (expression 13)

When $X_0 = X_2$, $n_0 = n_2$ and $d_0 = d_2$, $$\frac{e_0}{e_2} \approx -\left(1 + \frac{3a_l}{2a_k}\right).$$ (expression 14)

By setting the individual parameters as explained above, the value representing the output voltage $e_0$ can be adjusted relative to the input voltage $e_2$ as expressed above. Namely, the expression above indicates that an electrostatic transformer that does not require the coils needed in the related art can be achieved. In more specific terms, the ratio of the input voltage and the output voltage (i.e., the voltage amplification rate) can be set to a desired value in correspondence to the values representing the dimensions of movable portions ($a_k$ and $a_l$) when specific conditions ($X_0 = X_2$, $n_0 = n_2$ and $d_0 = d_2$) exist. In other words, with $a_k$ representing the distance between the fulcrum of rotation of the first movable electrode and an intermediate position of the first movable electrode and $a_l$ representing the distance between the intermediate position of the first movable electrode and an intermediate position of the second movable electrode, the ratio $|e_{out}/e_{in}|$ of the voltage $e_{out}$ of the AC output signal to the voltage $e_{in}$ of the AC input signal can be expressed as below, as long as the first movable electrode and the second movable electrode rotate along the same direction, centered on the fulcrum.

$$|e_{out}/e_{in}| = |1 + 3a_l/2a_k|$$

Figure 8:
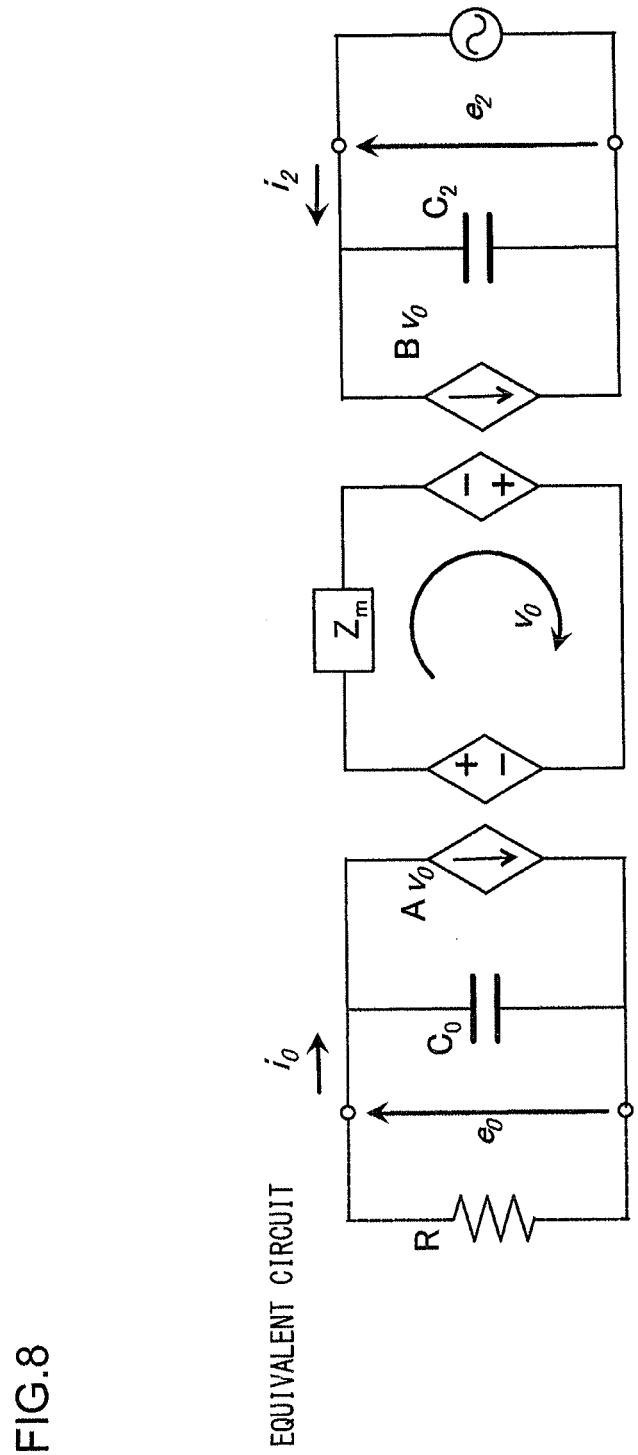
FIG. 8 A diagram of a circuit electrically equivalent to that of the electrostatic induction conversion device shown in FIG. 7, obtained through driving point matrix operation.
Figure 9:
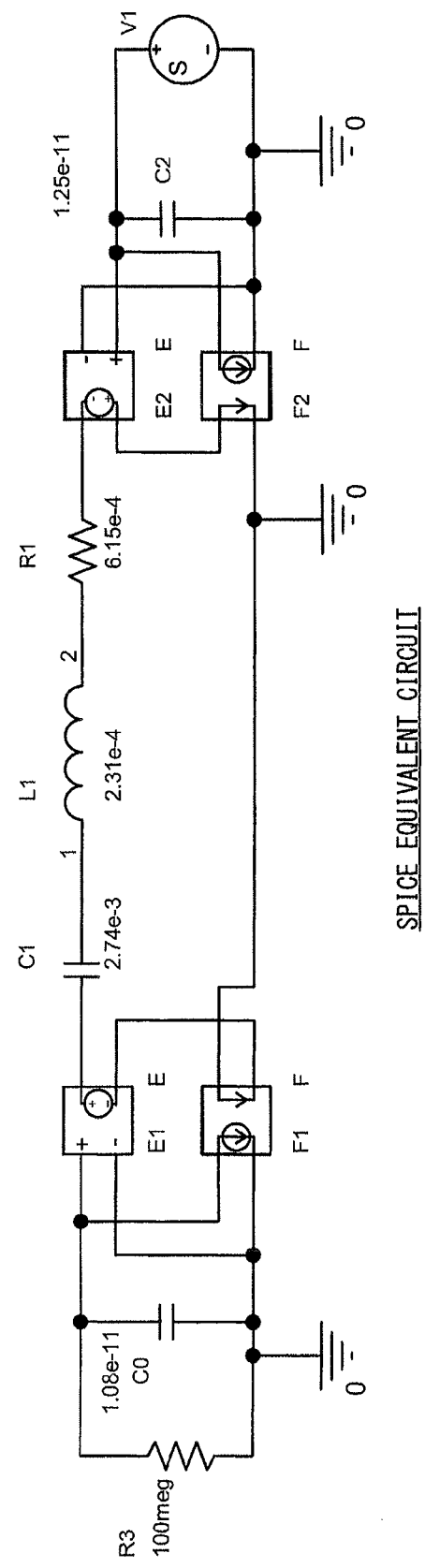
FIG. 9 A diagram showing an SPICE equivalent circuit to the electrostatic induction conversion device shown in FIG. 7.
Figure 10:
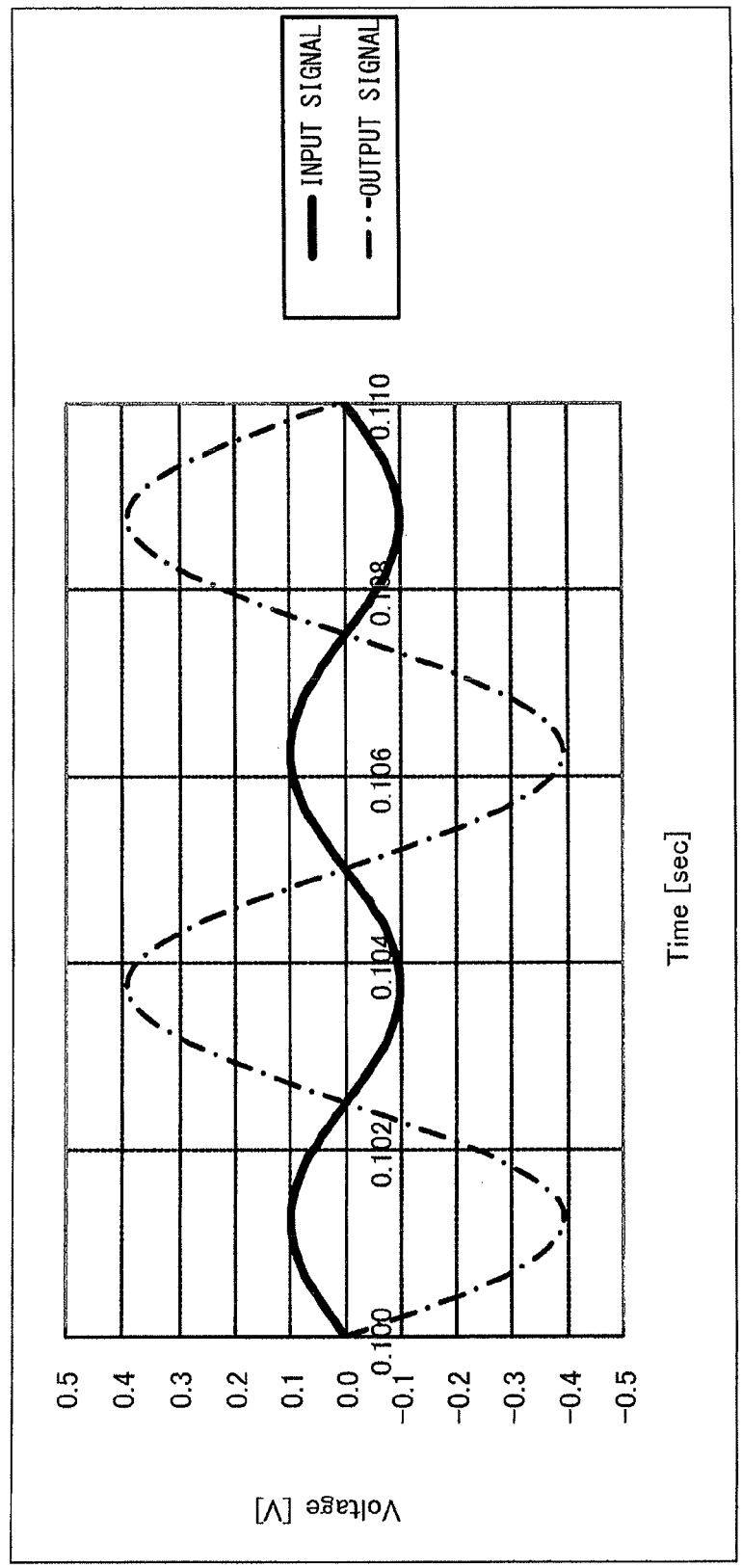
FIG. 10 The results of simulation executed by using the SPICE equivalent circuit.

FIG. 8 presents a circuit diagram of the electrical equivalent circuit to the electrostatic induction conversion device shown in FIG. 7, calculated through the driving point matrix. FIG. 9 presents an SPICE equivalent circuit diagram drawn based upon this electrical equivalent circuit. FIG. 10 presents simulation results obtained by using the SPICE equivalent circuit shown in FIG. 9. FIG. 10 indicates that the voltage amplification rate of approximately 3.9 is achieved. However, this simply represents an example and the voltage amplification rate can be freely adjusted through design.

Figure 11:
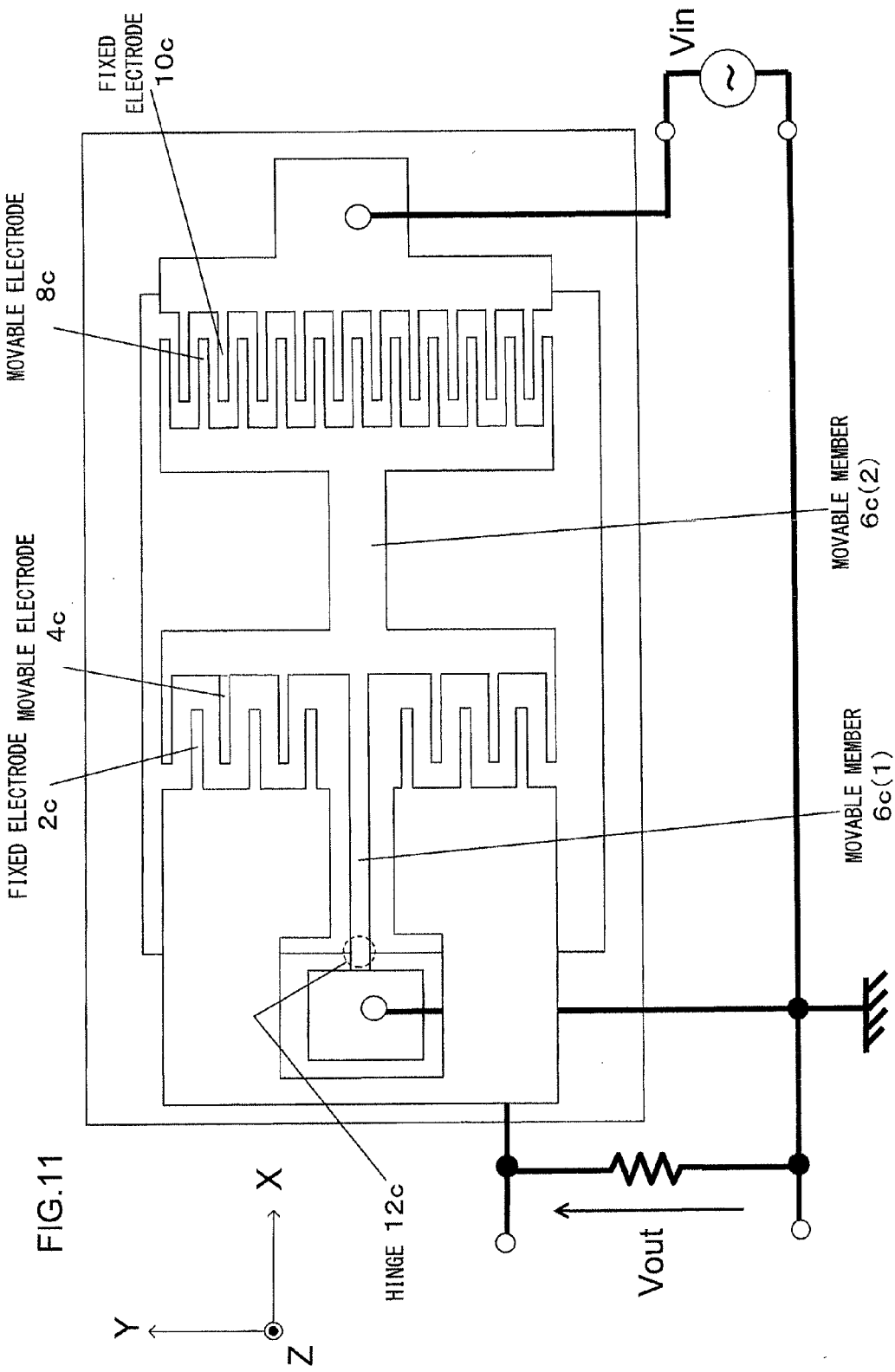
FIG. 11 A diagram showing a Z-direction oscillation-type comb teeth electrostatic transformer configured by adopting embodiment 1.

FIG. 11 shows a Z-direction oscillation type comb teeth electrostatic transformer, achieved by adopting the electrostatic induction conversion device shown in FIG. 7. This electrostatic transformer can be configured as a compact transformer through the MEMS technology by forming an oxide film electret on comb teeth surfaces facing opposite each other and inputting an electrical alternating current signal between the input side fixed comb teeth electrode and the input-side movable electrode.

Since there is obviously no need for generating a magnetic flux, there is no risk of surrounding elements being adversely affected by magnetism. Furthermore, in addition to boosting the voltage by setting the output-side capacity or the output impedance lower than the input-side capacity or the input impedance, the voltage can be lowered by setting a greater capacity value for the output side compared to the capacity value on the input side.

Figure 12:
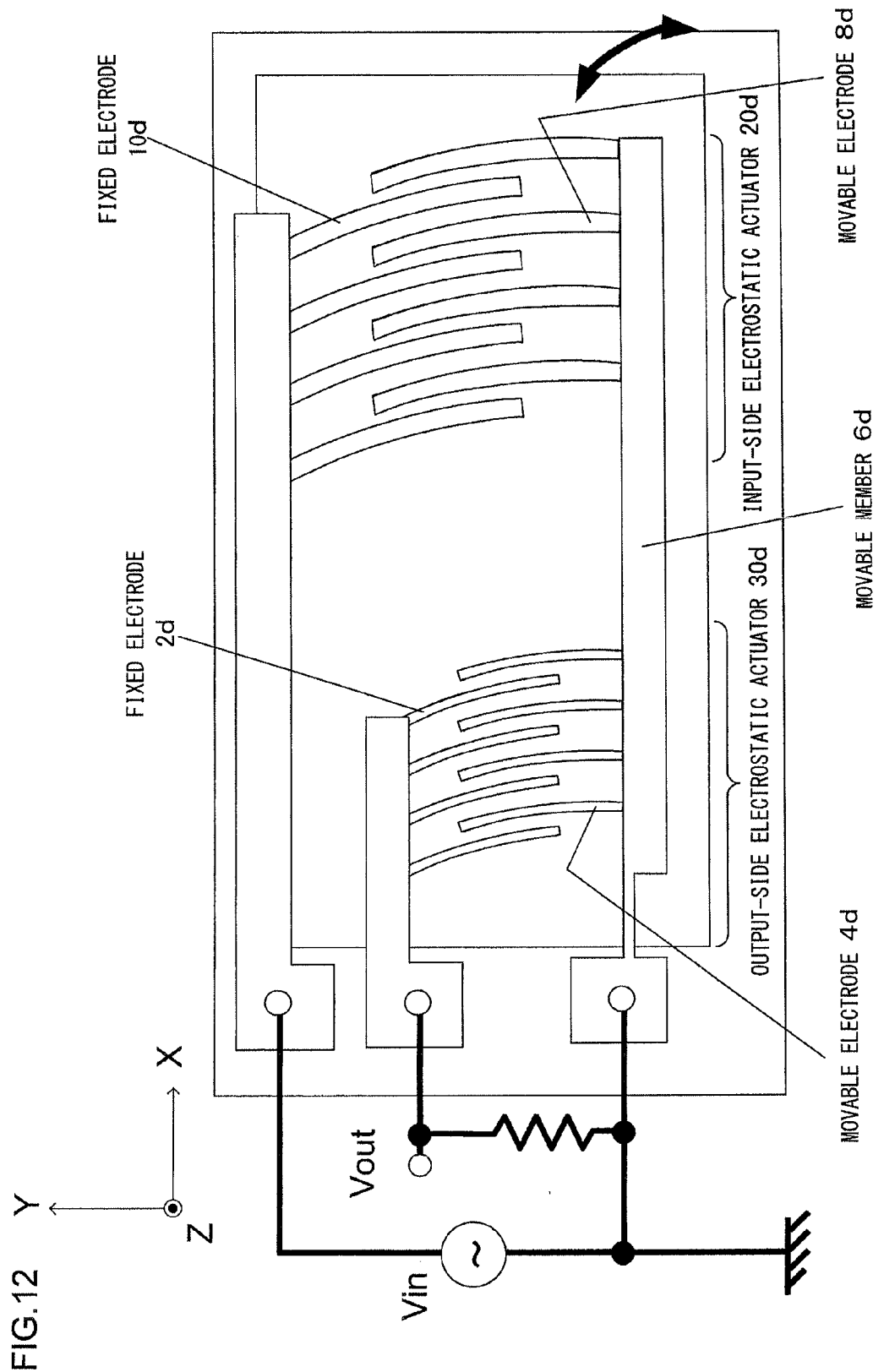
FIG. 12 A diagram showing a Y-direction oscillation-type comb teeth electrostatic transformer configured by adopting embodiment 1.

FIG. 12 shows a Y-direction oscillation type comb teeth electrostatic transformer having comb teeth electrodes that rotate along the Y axis. Since the basic operational principle is similar to that of the Z-direction oscillation type comb teeth electrostatic transformer shown in FIG. 11, a repeated explanation is not provided.

The structures and the operational principle with regard to the comb teeth electrostatic transformers shown in FIG. 11 and FIG. 12 are summarized in (i)~(v) below.

(i) They each adopt a three-terminal electrostatic transformer structure.

(ii) A difference between the amplitude on the input side and the amplitude on the output side is created through a system adopting, for instance, the principle of leverage.

(iii) A desired voltage boosting ratio can be set by selecting optimal values for the electrostatic capacity and the electromechanical coupling coefficients so as to create a situation in which input side amplitude>output side amplitude is true.

(iv) When boosting the voltage, the electrostatic capacity on the output side can be lowered compared to those in the conversion devices shown in FIG. 1 and FIG. 4, making it possible to raise the voltage for impedance matching and ultimately to achieve a higher voltage with relative ease.

(v) In the conversion devices described as examples of the prerequisite base technologies in reference to FIG. 1 and FIG. 4, the displacement quantity on the output side, further away from the hinge, is set greater than the displacement quantity on the input side in line with the principle of leverage, the electric charge obtained through electrostatic induction is extracted as an electric current and a boosted voltage is extracted by applying an optimal load to the output current. This means that both require design modifications in order to function as voltage lowering transformers.

In contrast, the comb teeth electrostatic transformers shown in FIG. 11 in FIG. 12, each having electrets formed both on the input side and on the output side so as to achieve an input/output connection which is the reverse of the input/output connection in the conversion devices shown in FIGS. 1 and 4, provide a boosted voltage to be extracted on the output side with a higher impedance (output impedance). Thus, simply by reversing the input side/output side connection, they can each be switched to function as a voltage boosting transformer or a voltage lowering transformer.

It is to be noted that while it is desirable to vary the amplitude of oscillation for the input-side comb teeth and the output-side comb teeth, the voltage can be boosted or lowered even when the input side amplitude and the output side amplitude match, by adjusting the electromechanical coupling coefficients (A and B in (expression 13)) in correspondence to the capacities at the comb teeth and the level of charge at the electrets, as indicated in (expression 6), (expression 7) and (expression 13).

In addition, when the input side amplitude and the output side amplitude do not match, the difference in the amplitude is expressed with the dimensional values $a_j$ and $a_k$ in (expression 7). Since B in (expression 13) changes in correspondence to the difference in the amplitude, the amplification rate or the reduction rate at which the voltage is boosted or lowered can be increased accordingly.

Embodiment 2

Figure 13:
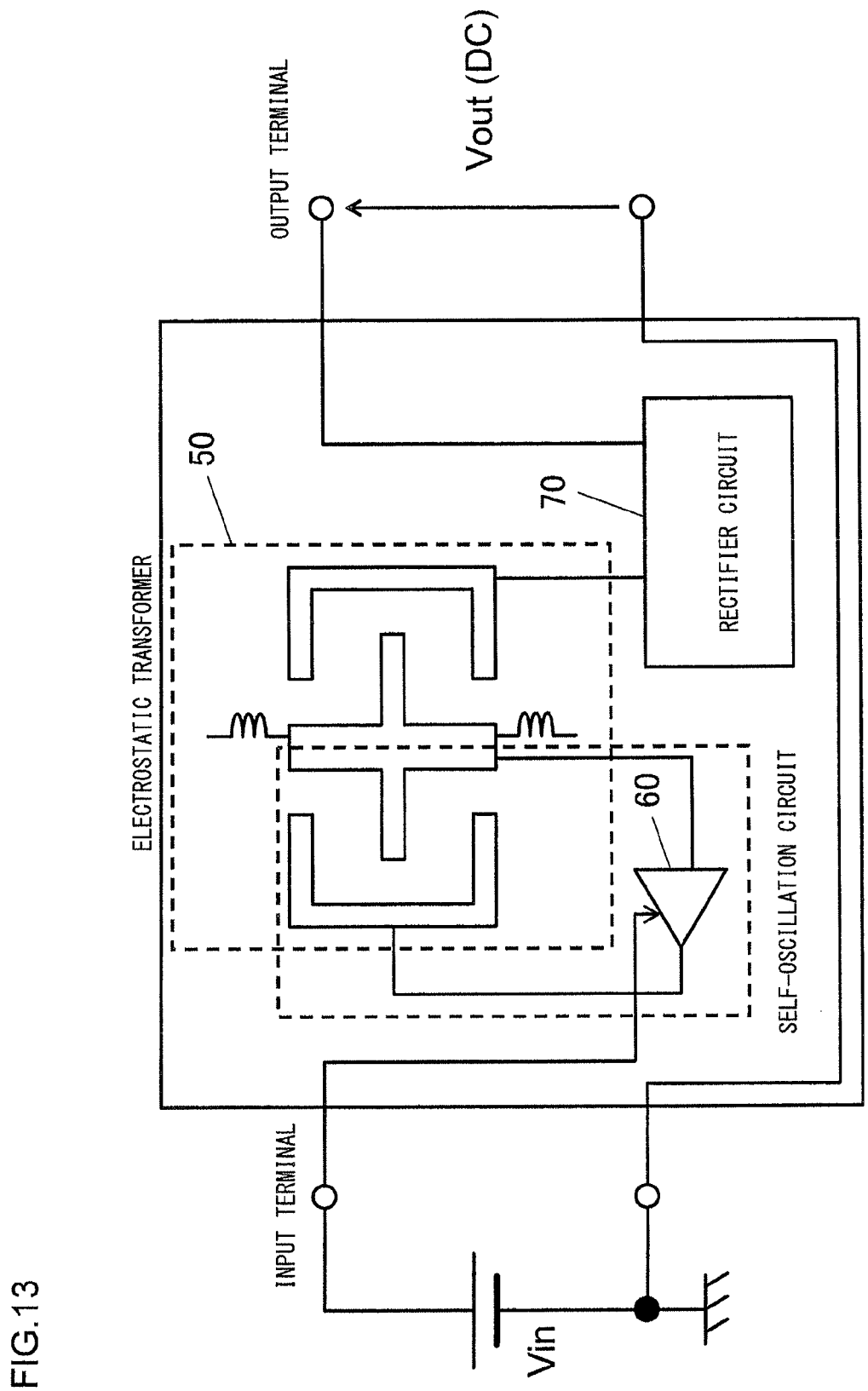
FIG. 13 A circuit diagram of the DC-DC converter configured as embodiment 2 of the present invention.

FIG. 13 presents a circuit diagram pertaining to a DC-DC converter configured with an electrostatic transformer (comb teeth drive electrostatic transformer). While an electrostatic transformer 50 in the figure actually includes a plurality of comb teeth as does the electrostatic transformers described in reference to FIG. 7, FIG. 11 and FIG. 12, the illustration in FIG. 13 only shows a single movable comb tooth. This electrostatic transformer 50 is inserted between an input terminal and an output terminal of a variable gain amplifier 60 having an AGC (auto gain control) function. The reference voltage needed to fulfill the AGC function in this DC-DC converter is provided via a DC voltage source capable of generating a DC voltage Vin. The amplitude of an oscillation signal is in proportion to the level of the DC voltage Vin. A DC voltage Vout is output via a rectifier circuit 70.

Figure 14:
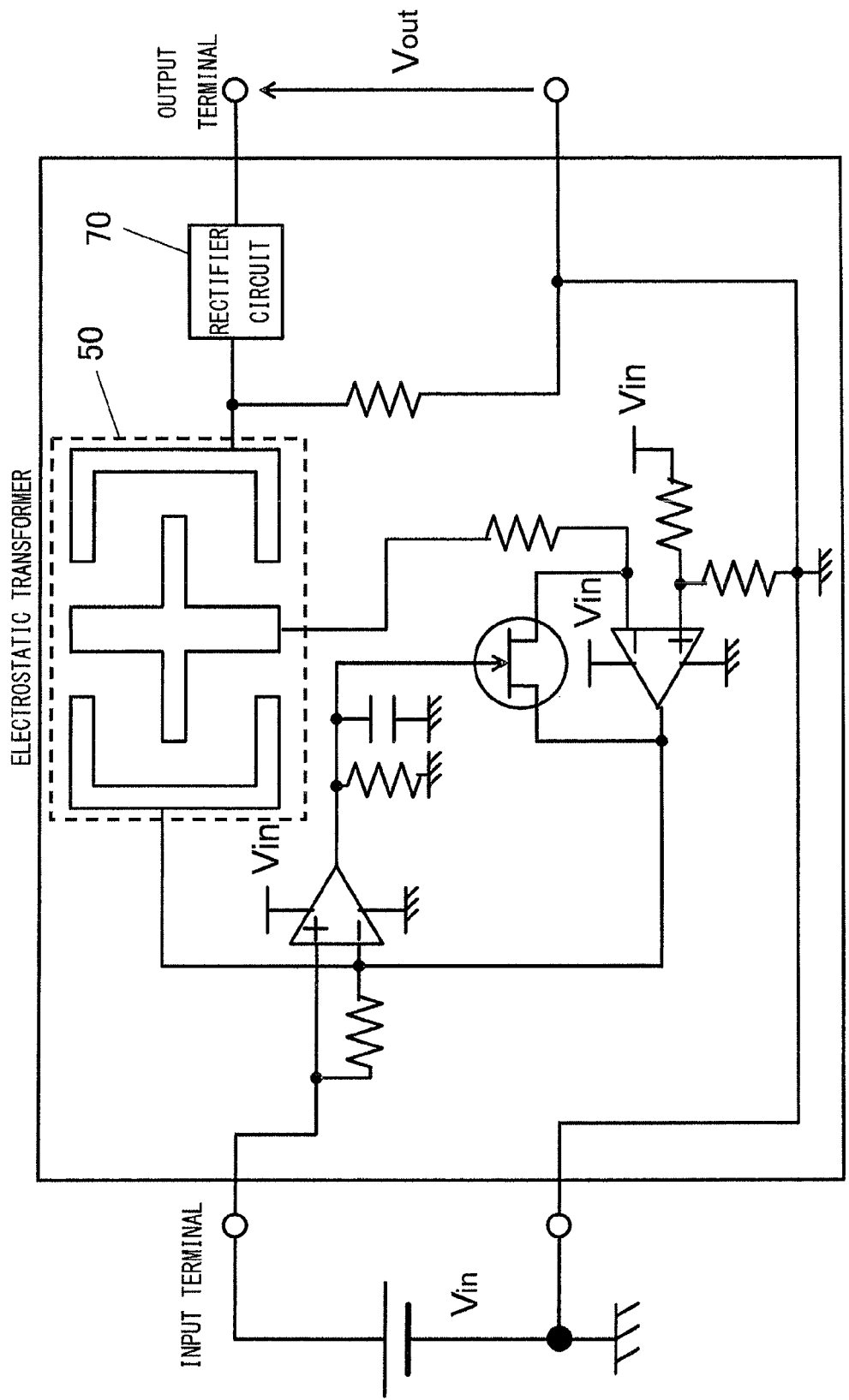
FIG. 14 A circuit diagram providing further details with regard to the circuit shown in FIG. 13.
Figure 15:
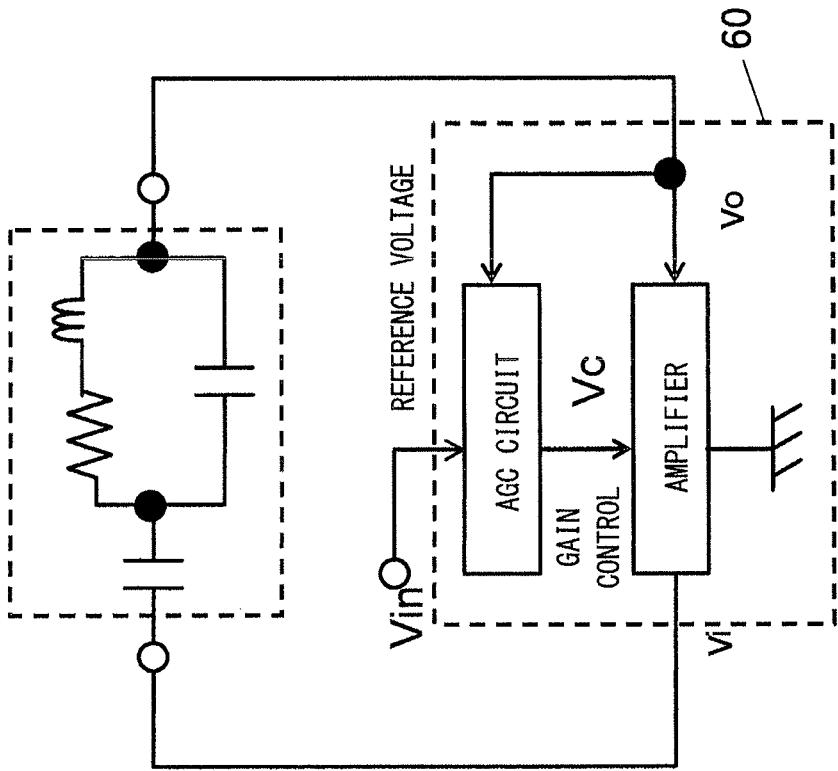
FIG. 15 A circuit diagram indicating the operational principle of the self-excited oscillation circuit included in the DC-DC converter.

FIG. 14 is a circuit diagram that provides additional details to the circuit diagram in FIG. 13. In addition, FIG. 15 is a circuit diagram indicating the operational principle of the self-oscillation circuit included in the DC-DC converter.

A DC-DC converter is thus configured by forming a self-oscillation circuit with the input-side comb teeth installed in a feedback circuit in embodiment 2. Namely, as a DC voltage is applied to the input-side comb teeth, an AC signal is generated through self-excited oscillation, inducing oscillation of the movable comb teeth electrodes. The resonance frequency of the comb teeth electrodes matches the frequency of the signal generated through the self-excited oscillation. The output-side signal, generated as the output-side movable comb teeth electrode oscillates, is rectified and the rectified signal is used as an output voltage (DC). It is to be noted that since the concept of inserting a comb teeth-actuator in a self-oscillation circuit and the concept of controlling the gain at an amplifier by using an AGC circuit are of the known art, as disclosed in Japanese Patent No. 4708455 (Japanese laid open patent publication No. 2009-8671), a detailed explanation will not be provided here.

Other Variations

Figure 16:
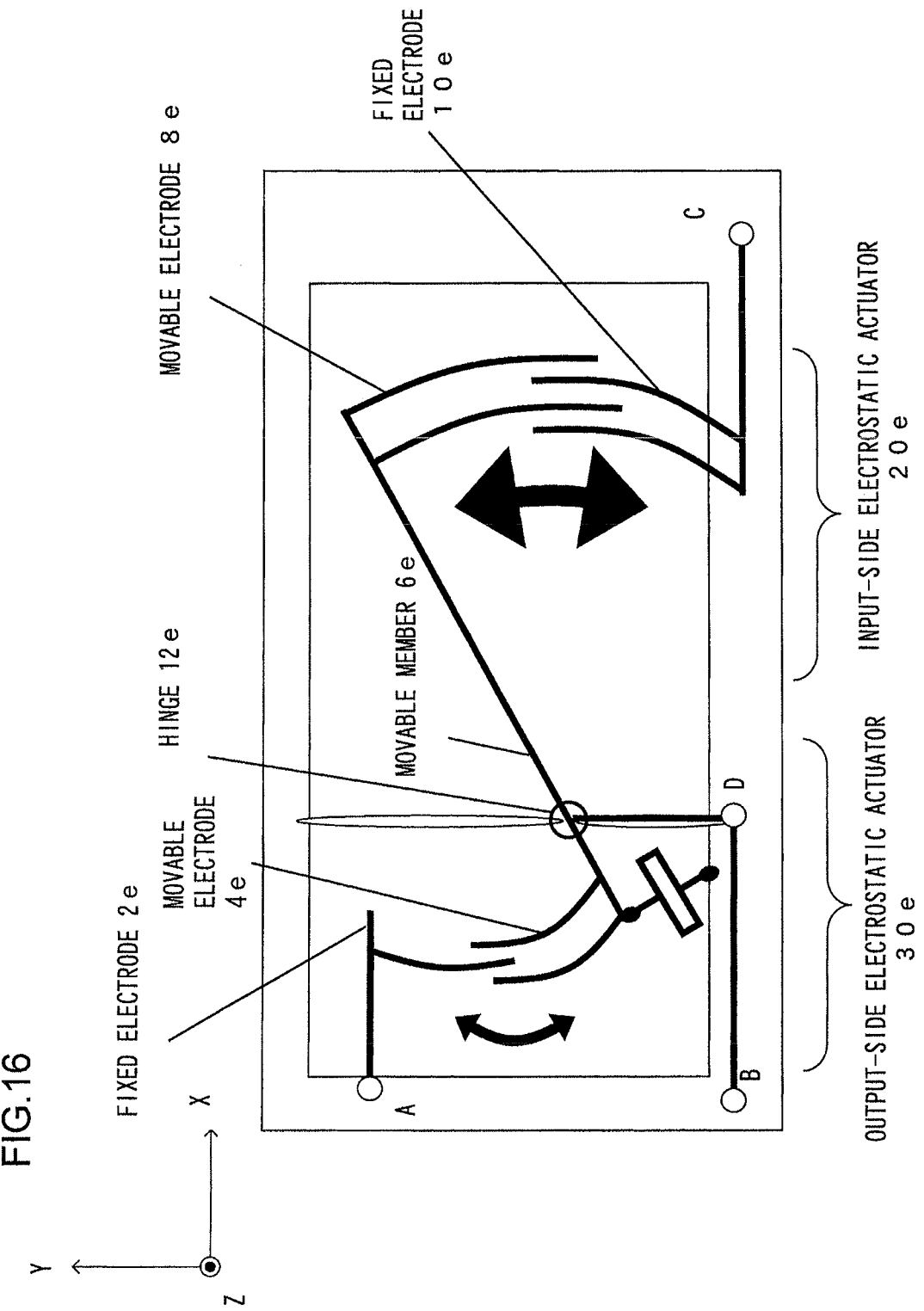
FIG. 16 An illustration of variation 1 achieved by disposing a hinge in an intermediate area of the movable member.

FIG. 16 shows variation 1, which includes a hinge located in an intermediate area of the movable member. The electrostatic conversion device shown in the figure is capable of fulfilling the functions of boosting/lowering the voltage between the input side and the output side, as is the electrostatic conversion device described in reference to embodiment 1. However, this electrostatic conversion device is distinguishable in that its movable member 6e rotates, centered on a hinge 12e, over the X-Y plane. In other words, the hinge 12e is constituted with a support member that holds an intermediate portion of the movable member 6e, and a movable electrode 4e, located on the left side of the engine 12e, and a movable electrode 8e, located on the right side of the hinge 12e, rotate along opposite directions.

As FIG. 16 clearly indicates, the movable member in an input-side electrostatic actuator 20e is physically connected with the movable electrode in an output-side electrostatic actuator 30e via the hinge 12e and the whole movable member 6e is configured with all these elements.

The distance between the movable electrode 8e and the hinge 12e is set greater than the distance between the movable electrode 4e and the hinge 12e. A degree of freedom, whereby the movable member 6e is able to oscillate over the plane (X-Y plane) is afforded via the hinge 12e, and comb teeth structures facing opposite each other and forming circular arcs, each constituting part of the circumference of a circle, the radius of which corresponds to the distance from the hinge 12e, are achieved by the two sets of electrodes, i.e., one made up with the fixed electrode 2e and the movable electrode 4e and the other made up with the fixed electrode 10e and the movable electrode 8e.

As FIG. 16 indicates, the movable member 6e linked to the movable electrode 4e oscillates around the hinge 12e. Since the movable electrode 8e rotates on a circular arc further away from the hinge 12c compared to the circular arc on which the input-side movable electrode 4e rotates, its amplitude is greater than the amplitude at the movable electrode 4e in line with the principle of leverage. Thus, the electrostatic induction conversion device described in reference to FIG. 16 may be regarded as a voltage booster transformer/voltage lowering transformer that includes the movable electrode 4e and the movable electrode 8e caused to rotate via the movable member 6e held by the hinge 12e.

Figure 17:
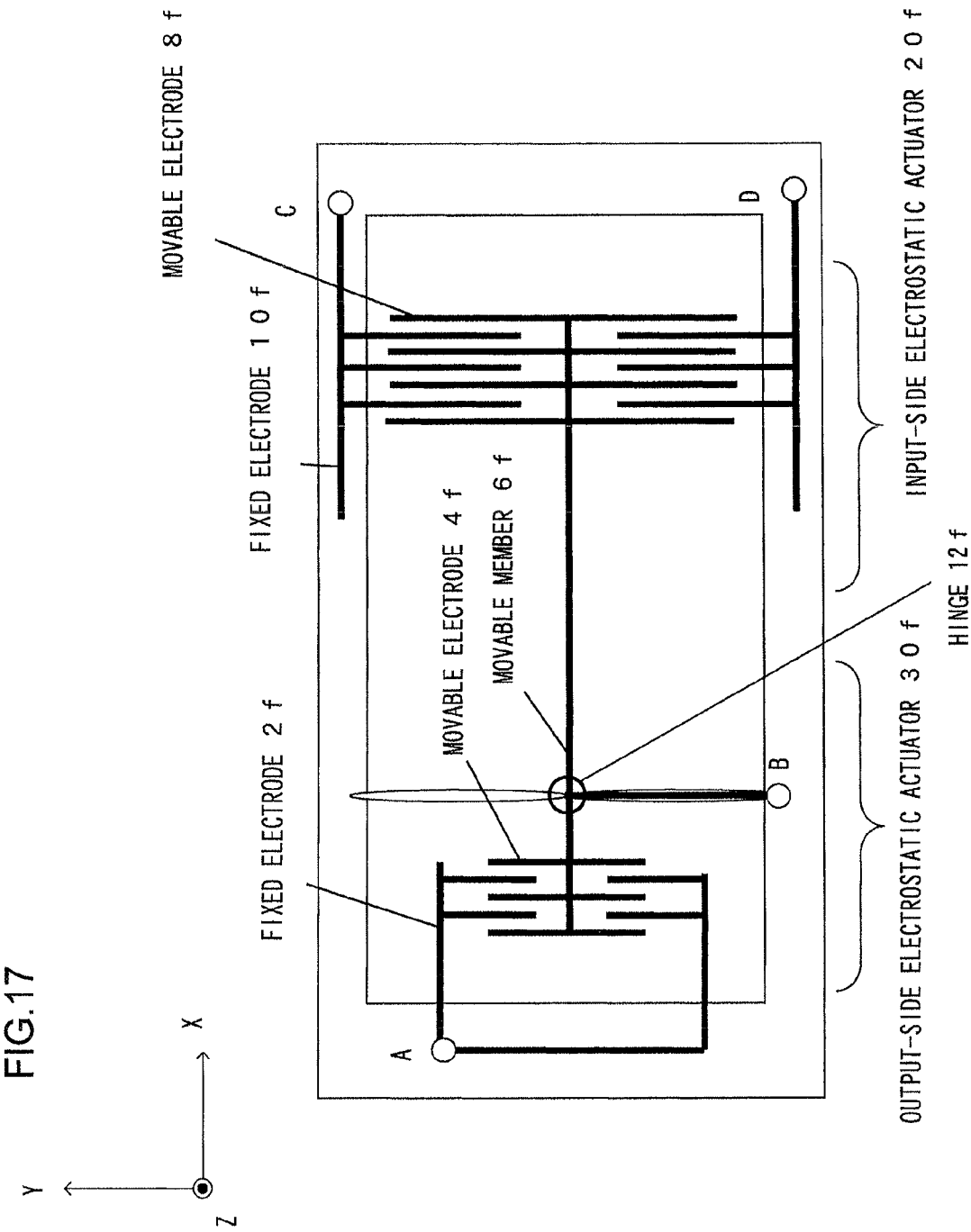
FIG. 17 An illustration of variation 2 achieved by disposing a hinge in an intermediate area of a movable member.

FIG. 17 shows variation 2, which includes a hinge located in an intermediate area of a movable member. The electrostatic conversion device shown in the figure is capable of fulfilling the functions of boosting/lowering the voltage between the input side and the output side, as is the electrostatic conversion device described in reference to embodiment 1. However, this electrostatic conversion device is distinguishable in that its movable member 6f rotates, centered on a hinge 12f along the vertical direction (along the Z axis). In other words, the hinge 12f is constituted with a support member that holds an intermediate portion of the movable member 6f, and a movable electrode 4f, located on the left side of the hinge 12f and a movable electrode 8f located on the right side of the hinge 12f, rotate along opposite directions.

As FIG. 17 clearly indicates, the movable member in an input-side electrostatic actuator 20f is physically connected with the movable electrode in an output-side electrostatic actuator 30f via the hinge 12f, and the whole movable member 6f is configured with all these elements.

The distance between the movable electrode 8f and the hinge 12f is set greater than the distance between the movable electrode 4f and the hinge 12f. A degree of freedom, whereby the movable member 6f is able to oscillate along the vertical direction (along the Z axis) is afforded via the hinge 12f, and comb teeth structures facing opposite each other and forming circular arcs, each constituting part of the circumference of a circle, the radius of which corresponds to the distance from the hinge 12f, are achieved by the two sets of electrodes, i.e., one made up with the fixed electrode 2f and the movable electrode 4f and the other made up with the fixed electrode 10f and the movable electrode 8f.

The movable member 6f linked to the movable electrode 4f oscillates, centered on the hinge 12f, along the up/down direction. The movable electrode 8f rotates on a circular arc further away from the hinge 12f compared to the circular arc on which the movable electrode 4f rotates.

Operations and Advantageous Effects of the Embodiments

The following is a list of operations (or advantageous effects) brought forth through the embodiments of the present invention.

Since an electrostatic transformer uses an electric field, any adverse effect on other elements can be eliminated through electrostatic shielding, which makes it possible to provide the electrostatic transformer as a more compact unit compared to a transformer configured with coils.

Since such a transformer is less likely to be affected by a magnetic field and also does not readily affect a magnetic field, it will be ideal in various fields of application. For instance, it may be adopted as a transformer that converts the voltage to be used when writing data into a magnetic recording element or a transformer for an optoelectronic amplifier device sensitive to magnetic fields.

A DC-DC converter can be configured by installing the electrostatic transformer in a self-oscillation circuit.

Since the entire movable portion may be configured with an electret without having to electrically isolate the terminals at the movable portion, the structure itself can be simplified and the manufacturing process is also thus simplified.

A switchover between voltage boosting and voltage lowering can be achieved simply by reversing input side/output side designations without having to modify the design.

It is to be noted that the embodiments described above simply represent examples and the present invention is in no way limited to these examples as long as the features characterizing the present invention remain intact. An embodiment may be adopted in combination with one of the variations or an embodiment and a plurality of variations may be adopted in combination. In addition, variations may be adopted in any conceivable combination as well. Furthermore, any other mode conceivable within the technical range of the present invention should be considered to be within the scope of the present invention.

The disclosure of the following priority application is herein incorporated by reference: Japanese Patent Application No. 2012-192113 filed Aug. 31, 2012.

REFERENCE SIGNS LIST 2 fixed electrode
4 movable electrode
6 movable member
8 movable electrode
10 fixed electrode
20 input-side electrostatic actuator
30 output-side electrostatic actuator

The invention claimed is:

1. An electrostatic induction conversion device, comprising:
an input-side electrostatic actuator that includes a first fixed electrode and a first movable electrode facing the first fixed electrode; and
an output-side electrostatic actuator that includes a second movable electrode linked to the first movable electrode via a link mechanism member, which increases or decreases a displacement quantity representing an extent of displacement occurring at the first movable electrode, and a second fixed electrode facing the second movable electrode, wherein:
a permanently charged layer is deposited on an electrode surface either on a movable electrode side or on a fixed electrode side, at the input-side electrostatic actuator and the output-side electrostatic actuator.

2. An electrostatic induction conversion device according to claim 1, wherein:
the first movable electrode, the link mechanism member and the second movable electrode are all formed by using a single material.

3. An electrostatic induction conversion device according to claim 2, wherein:
a movable portion, which is configured with the first movable electrode, the link mechanism member and the second movable electrode, rotates as one centered on a hinge mechanism located at an end of the link mechanism member or at a specific intermediate position at the link mechanism member.

4. An electrostatic induction conversion device according to claim 3, wherein:
if the hinge mechanism is located at the end of the link mechanism member, the first movable electrode and the second movable electrode rotate, centered on the end of the link mechanism member, along matching directions; and
if the hinge mechanism is located at the specific intermediate position at the link mechanism member, the first movable electrode and the second movable electrode rotate, centered on the specific intermediate position, along opposite directions.

5. A DC-DC converter, comprising:
an electrostatic induction conversion device according to claim 4;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

6. A DC-DC converter, comprising:
an electrostatic induction conversion device according to claim 3;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

7. A DC-DC converter, comprising:
an electrostatic induction conversion device according to claim 2;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

8. An electrostatic induction conversion device according to claim 1, wherein:
as the first movable electrode is caused to oscillate by applying an AC input signal to the input-side electrostatic actuator and the second movable electrode is caused to oscillate in correspondence to oscillation of the first movable electrode, an AC output signal, resulting from boosting or lowering the voltage of the AC input signal, is obtained from the output-side electrostatic actuator.

9. An electrostatic induction conversion device according to claim 8, wherein:
a ratio of the voltage of the AC input signal and the voltage of the AC output signal is determined based upon a length of the first movable electrode, a length of the link mechanism member and a length of the second movable electrode.

10. An electrostatic induction conversion device according to claim 9, wherein:
when $a_k$ represents a distance between a fulcrum of rotation of the second movable electrode and an intermediate position at the second movable electrode, $a_l$ represents a distance between the intermediate position at the second movable electrode and an intermediate position at the first movable electrode, and the first movable electrode and the second movable electrode rotate, centered on the fulcrum, along matching directions; and
the ratio $|e_{out}/e_{in}|$ of the voltage $e_{in}$ of the AC input signal and the voltage $e_{out}$ of the AC output signal is expressed as $|e_{out}/e_{in}|=|1+3a_l/2a_k|$.

11. A DC-DC converter, comprising:
an electrostatic induction conversion device according to claim 10;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

12. A DC-DC converter, comprising:
an electrostatic induction conversion device according to claim 9;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

13. A DC-DC converter, comprising:
an electrostatic induction conversion device according to claim 8;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

14. A DC-DC converter, comprising:
an electrostatic induction conversion device according to claim 1;
an amplifier that has a gain determined based upon an input DC voltage; and
a rectifier circuit, wherein:
a self-oscillation circuit is formed by connecting the input-side electrostatic actuator in the electrostatic induction conversion device between an input terminal and an output terminal of the amplifier;
as an AC signal generated through the self-oscillation circuit is input to the input-side electrostatic actuator, an AC signal is output from the output-side electrostatic actuator corresponding to the input-side electrostatic actuator in the electrostatic induction conversion device; and
the rectifier circuit outputs a DC voltage by rectifying the AC signal output from the output-side electrostatic actuator.

* * * * *